United States Patent
Huber et al.

(10) Patent No.: US 11,751,495 B2
(45) Date of Patent: Sep. 12, 2023

(54) TILLAGE IMPLEMENT WITH PRELOAD ASSEMBLY

(71) Applicant: Great Plains Manufacturing, Inc., Salina, KS (US)

(72) Inventors: Andrew B. Huber, McPherson, KS (US); Craig A. Reed, Salina, KS (US)

(73) Assignee: Great Plains Manufacturing, Inc., Salina, KS (US)

( * ) Notice: Subject to any disclaimer, the term of this patent is extended or adjusted under 35 U.S.C. 154(b) by 369 days.

(21) Appl. No.: 17/106,405

(22) Filed: Nov. 30, 2020

(65) Prior Publication Data

US 2022/0167542 A1 Jun. 2, 2022

(51) Int. Cl.
*A01B 61/04* (2006.01)
*A01B 35/28* (2006.01)
*A01B 63/26* (2006.01)
*A01B 15/16* (2006.01)

(52) U.S. Cl.
CPC ............ *A01B 61/046* (2013.01); *A01B 35/28* (2013.01); *A01B 63/26* (2013.01); *A01B 15/16* (2013.01)

(58) Field of Classification Search
CPC ... A01B 63/008; A01B 61/046; A01B 61/044; A01B 15/02; A01B 15/16; A01B 15/18; A01B 21/08; A01C 7/205; A01C 5/064; A01C 7/203
See application file for complete search history.

(56) References Cited

U.S. PATENT DOCUMENTS

| | | | | |
|---|---|---|---|---|
| 2,906,353 A | * | 9/1959 | Rogers | A01B 35/22 |
| | | | | 172/708 |
| 3,402,773 A | * | 9/1968 | Jennings | A01B 61/046 |
| | | | | 172/265 |
| 3,414,252 A | | 12/1968 | Frager et al. | |
| 3,451,489 A | * | 6/1969 | Sullivan | A01B 15/18 |
| | | | | 172/264 |
| 3,575,243 A | | 4/1971 | Mark et al. | |

(Continued)

FOREIGN PATENT DOCUMENTS

EP 1182920 B1 9/2003
EP 1332655 B1 12/2007

(Continued)

*Primary Examiner* — Adam J Behrens
*Assistant Examiner* — Blake E Scoville
(74) *Attorney, Agent, or Firm* — Hovey Williams LLP; Kameron D. Kelly (57) ABSTRACT

A tillage implement, a tillage machine, and a method of tilling soil is provided. The tillage implement includes a mounting bracket that couples to a rolling frame, a shank pivotably coupled to the mounting bracket via a hinge assembly, a soil working tool operatively coupled to a distal end of the shank, and a preload assembly for moving the shank to a loaded position that is rotationally offset from an unloaded position. The tillage machine includes a rolling frame that is pulled by a tow vehicle when tilling a field and multiple ones of the tillage implements operatively coupled to the rolling frame that contact and till the field. And the method includes attaching the tillage implement to a rolling frame, preloading the hinge assembly by moving the shank to a loaded position that is rotationally offset from the unloaded position, and contacting the soil with the soil working tool.

20 Claims, 11 Drawing Sheets (56) References Cited

U.S. PATENT DOCUMENTS

| | | | |
|---|---|---|---|
| 3,981,472 A | | 9/1976 | Anderson |
| 4,463,813 A | * | 8/1984 | Long ................... A01B 61/046 172/705 |
| 4,466,492 A | * | 8/1984 | Steinberg ............... A01B 35/28 172/551 |
| 4,947,770 A | * | 8/1990 | Johnston ................ A01B 35/28 111/167 |
| 4,977,841 A | * | 12/1990 | Truax .................... A01C 7/205 111/926 |
| 5,140,763 A | * | 8/1992 | Nichols, IV ............ E01H 5/062 37/270 |
| 5,427,183 A | * | 6/1995 | Parker .................. A01B 61/046 172/264 |
| 8,596,374 B2 | * | 12/2013 | Kile .................... A01B 61/046 172/265 |
| 2015/0271980 A1 | * | 10/2015 | Steinlage ............... A01B 15/16 172/604 |
| 2018/0228072 A1 | * | 8/2018 | Cresswell ............ A01B 21/086 |

FOREIGN PATENT DOCUMENTS

| EP | 2642842 B1 | 10/2016 |
|---|---|---|
| EP | 1616467 B1 | 3/2017 |

\* cited by examiner

TILLAGE IMPLEMENT WITH PRELOAD ASSEMBLY

BACKGROUND OF THE INVENTION

Many different types of tillage machines are used to prepare fields for planting such as, without limitation, cultivators, field finishers, and other known tillers. At a high level, such tillage machines generally include a towable frame having a series of transversely extending rows of soil-working tooling. For example, some known cultivators include one or more rows of coulters, upright discs, sweeps, tines, baskets, reels, and/or other soil working tools that cut into the soil being cultivated, slicing through plant debris and hardpacked soil crust and thus preparing the soil for planting.

As the tillage machine is pulled through a field, the soil-working tools may encounter rocks, debris, and other obstacles in the field. For rigidly mounted tools, if a tool strikes the obstacle with enough force it can become damaged or separated from the frame. Thus, some known tillage machines include flexibly mounted implements. For such implements, the shank is pivotably coupled to the tillage machine via rubber springs or the like. As the tool encounters a rock or other obstacle, the rubber springs compress and permit the shank to deflect and traverse the obstacle, before biasing the shank back to an operating position.

Because, by design, such implements are permitted to deflect, these implements have certain attendant drawbacks. When the implement is first lowered onto the soil, the force of the soil-working tool contacting the soil will compress the rubber springs, causing the shank and corresponding soil-working tool to deflect. This makes it difficult to achieve consistent and predictable cuts in the soil because the soil-working tool will oscillate between unloaded and loaded positions. Some flexible-type implements attempt to overcome this drawback by providing a stiffer spring that is more difficult to compress and thus does not deflect as much when the tillage implement is first lowered to the soil. Such springs, however, make assembly of the tillage implement difficult, render the implements less responsive to obstacles in the field, and are susceptible to early failure.

There thus remains a need for a flexible or spring-type tillage implement which overcomes one or more of these drawbacks. More particularly, there remains a need for a flexible or spring-type tillage implement that exhibits minimal deflection when first lowered to the soil but which can sufficiently traverse obstacles in the field without premature failure.

BRIEF SUMMARY OF THE INVENTION

Aspects of the invention are directed to a flexible or spring-type tillage implement such as a rotary disc of a tillage machine or similar that includes one or more compression or torsion springs or other biasing member that allow a shank of the tillage implement to pivot as the implement is pulled across a field. The tillage implement beneficially includes a preload assembly that preloads the biasing member prior to the implement engaging the soil. In some embodiments the biasing member may be preloaded to a load near or even at an operating load of the biasing member. Preloading the biasing member in this manner reduces or eliminates the initial deflection of the tillage implement when the implement is initially lowered into the soil while still permitting use of a relatively pliable biasing member so that the implement can traverse obstacles in the field without premature failure. This results in more predictable and consistent cutting locations and depths, among other benefits that will be discussed more fully below.

For example, some embodiments of the invention are directed to a tillage implement. The tillage implement includes a mounting bracket that removably couples to a rolling frame, a shank pivotably coupled to the mounting bracket via a hinge assembly that includes a rotation inhibiting assembly biasing the shank toward an unloaded position relative to the mounting bracket, a soil working tool operatively coupled to a distal end of the shank, and a preload assembly for moving said shank to a loaded position that is rotationally offset from said unloaded position.

Other embodiments of the invention are directed to a tillage machine. The tillage machine includes a rolling frame to be pulled by a tow vehicle when tilling a field, and a plurality of the tillage implements similar to those described above. The plurality of tillage implements are operatively coupled to the rolling frame and contact and till the field as the rolling frame is being pulled by the tow vehicle.

Still other embodiments of the invention are directed to a method including attaching a tillage implement to a rolling frame, such as one of the tillage implements described above which thus includes a preload assembly. The method further includes preloading the hinge assembly by moving said shank to a loaded position that is rotationally offset from said unloaded position, and finally contacting the soil with the soil working tool.

These and other features will be discussed in more detail below in connection with the accompanying drawings.

BRIEF DESCRIPTION OF THE DRAWINGS

The present invention is described in detail below with reference to the attached drawing figures, wherein.

DETAILED DESCRIPTION OF THE INVENTION

Generally, aspects of the invention are directed to a tillage or other soil-working tool mounting shank with elastomeric compression or torsion spring mounts and a preload assembly that applies a set displacement to the spring shank assembly in the assembled state. The preload assembly adds a preload force to the shank before the tool engages the ground, thereby increasing the initial stiffness of the shank assembly.

Known rubber spring shank assemblies have a broad movement range when they first engage the soil and the load on the springs increases from near zero up to an operating force. This initial loading causes the disc or other soil working tool to move until the spring force builds up to the nominal operating range, allowing the depth and/or location of cut to vary.

The preload assembly described herein applies a preload force to the elastomeric compression or torsion spring mounts in order to compress to the springs at or near an operating force before the disc or other soil working tool engages the soil such that the shank is stiffer and more predictable as soon as it touches the soil. The shank of embodiments of the invention thus do not oscillate between low load and high load conditions and positions as is the case with known rubber spring shank assemblies. The combination of the elastomeric compression or torsion spring mounts and the preload assembly provides a more uniform depth and quality of operation versus a rubber spring shank with no preload. These and other aspects of the invention will become more apparent via the detailed description of the invention in connection with the accompanying figures.

First, FIGS. 1-7 show various views of a tillage implement 100 according to aspects of the invention. The tillage implement 100 generally includes a rotary disc 102 rotatably coupled to a shank 104 via a hub 108 and spindle 110. Although, for ease of discussion, aspects of the invention are discussed in connection with the rotary disc 102 as one example of a soil-working tool, the invention is not limited to tillage implements employing rotary discs and in other embodiments the implement 100 could include any other desired soil-working tool such as, without limitation, a cultivator sweep, a spring or tooth tine, a coulter, a harrow, a conditioning reel, a berm basket, or any other known soil working tool.

The shank 104 is pivotably coupled to a mounting bracket 106 via a hinge assembly 114 and a preload assembly 116, which will be discussed in greater detail below in connection with FIGS. 8-10. At a high level, the hinge assembly 114 and preload assembly 116 permit pivotable movement of the shank 104 and thus rotary disc 102 attached thereto as the implement 100 is pulled along a field and encounters an obstacle such as a rock or the like. More particularly, the hinge assembly 114 and preload assembly 116 permit upward deflection of the shank 104 and rotary disc 102 from a preloaded position (FIG. 9) such that the disc 102 or other tool can pass over an obstacle without damage. The hinge assembly 114 may include a rotation inhibiting assembly biasing the shank 104 toward an unloaded position (FIGS. 1-8) relative to the mounting bracket. For example, in one non-limiting example the hinge assembly 114 can include a plurality of compression springs 136 (also referred to as torsion springs, but which will be referred to herein as compression springs for ease of discussion) biasing the shank 104 toward the unloaded position. In other embodiments, other rotating inhibiting assemblies (e.g., a single elastomeric piece, a torsional spring, a single metal compression spring, a tension spring, a pneumatic cylinder, etc.) without departing from the scope of the invention. At a high level, the preload assembly 116 is configured to maintain the shank 104 in a loaded position (FIG. 9) that is rotationally offset from said unloaded position. This will be discussed in more detail below in connection with FIGS. 8-10.

The mounting bracket 106 is configured to attach to a beam, rod, or other member of a towable frame, thereby forming part of a tillage machine such as a tiller, cultivator, field finisher, or the like, referred to generally herein as a cultivator for ease of discussion. The mounting bracket 106 generally includes a mounting plate 122 configured to abut the beam of the rolling frame, and a plurality of through holes 124 through which fasteners (e.g., bolts) pass through and secure the mounting bracket 106, and thus the tillage implement 100, to the frame. In some embodiments, the cultivator includes a lattice of steel beams forming the towable frame, and multiple ones of the tillage implements 100 are mounted to the frame in one or more rows to contact and thus till or otherwise work a field as the towable frame is pulled behind a tractor or similar tow vehicle. In some embodiments, a plurality of the tillage implements 100 will be mounted a predetermined distance apart along the towable frame such that when the frame and implements 100 are pulled across a field, multiple parallel, tilled strips are created in the fields and separated by untouched or unworked portions of the field.

The mounting bracket 106 further includes a pair of opposing, spaced apart side walls 118, 120, fixedly coupled to the mounting plate 122 at a portion of the upper end thereof. The side walls 118, 120 are further fixedly coupled to each other via one or more transverse members such as, in the depicted embodiment, a bracket plate 128 and a tubular member 126 (FIGS. 8-10), which will be discussed in more detail below. The components of the mounting bracket 106—including the mounting plate 122, the opposing side walls 118, 120, the bracket plate 128, and the tubular member 126—can be fixedly coupled using any desired means including, without limitation, by welding the components to one another.

Again, the shank 104 (and thus rotary disc 102) is pivotably connected to the mounting bracket 106 via the hinge assembly 114 and the preload assembly 116. The hinge assembly 114 generally includes a hinge housing assembly which is generally diamond-shaped in cross section, and which includes a first hinge housing 130 removably coupled to a substantially mirror-image second hinge housing 132. Each hinge housing 130, 132 includes a pair of flanges with through-holes provided therein, which are removably coupled to one another via a plurality of fasteners 134. In the depicted embodiment, the plurality of fasteners 134 are each a bolt and nut assembly, but in other embodiments other types of fasteners could be employed without departing from the scope of the invention. Moreover, in some embodiments the twin housings 130, 132 could be welded together or otherwise semi-permanently or permanently coupled to one another without departing from the scope of the invention.

The lower of the two housings 132 is fixedly coupled to the shank 104 such as, in the depicted embodiment, by welding, although the hinge housing 132 could be fixedly or removably coupled to the shank 104 in any other desired manner without departing from the scope of the invention. During assembly of the tillage implement 100, the hinge assembly 114 is assembled by, in one non-limiting example, sandwiching the tubular member 126 of the mounting bracket 106 and a plurality of elastomeric compression springs 136 (FIGS. 8-10), or else other suitable rotation inhibiting member or biasing member, between the two housings 130, 132 and coupling the housings 130, 132 (and more particularly the flanges thereof) using the fasteners 134. Again, in other embodiments other biasing members or rotation inhibiting assemblies may be utilized without departing from the scope of the invention. When coupled in this manner, the shank 104 can pivotably move with respect to the mounting bracket 106 by compressing, and thus deforming, each of the elastomeric compression springs 136 and rotate about an axis extending through the tubular member 126. That is, the shank 104 is configured to pivot about an imaginary axis that runs through the center of the tubular member 126 so that, as the rotary disc 102 or other soil working tool encounters a rock or other obstacle in a field, the shank 104 deflects upward allowing the disc 102 to pass over the obstacle without damage. The shank 104 and thus disc 102 coupled thereto will thereafter return to its working position due to a biasing force exerted on the shank 104 via the plurality of compression springs 136.

In some embodiments, multiple ones of the tillage implements may be optionally gang mounted to a common frame member. For example, in some embodiments the tubular member 126 may be an elongated tubular or other frame member that spans horizontally across more than one of the tillage implements 100. In such embodiments, the hinge assembly 114 of each respective tillage implement is operatively coupled to the elongated tubular or other frame member. More particularly, in such embodiments the elongated, common tubular or other frame member will be sandwiched between the two housings 130, 132 of each respective tillage implement. This will be more fully discussed below in connection with FIG. 11.

The preload assembly 116 extends from the shank 104 to the mounting bracket 106 and is configured to compress, and thus preload, the compression springs 136 before the tillage implement 100 comes into contact with the soil or is otherwise is in an operating condition. Again, for rubber spring shank assemblies that do not have such a preload assembly 116, the shank and soil-working tool will deflect (that is, pivot upward) when the soil-working tool first comes into contact with the soil as the load on the springs increases from an initial load up to an operating force such as at least 100 pounds and, more particularly, approximately 250 pounds. The "initial load" is the loading exhibited on the springs by virtue of the compression of the springs during assembly of the spring assembly such as by, for example, the springs being sandwiched between the tubular member 126 and the housings 130, 132 as the fasteners 134 are tightened down, causing the springs to compress and slightly deform. The external force exhibited on the rubber spring shank assembly, which is transferred to the springs thereof, due to contact of the soil-working tool with the soil causes the disc or other soil-working tool to move until the spring force builds up to the nominal operating range, allowing the depth and/or location of cut to vary. In order to overcome too much initial deflection of the shank, stiff rubber compression springs must be used, which makes assembly of such shank assemblies difficult. However, these stiffer rubber compression springs are not flexible enough to allow for sufficient deflection of the soil-working tool when the soil working tool comes into contact with an obstacle in the field. Moreover, these stiffer rubber compression springs will exert excessive stresses on the soil-working tool, spindle, mount, and machine frame when assembly deflects in the field and thus can lead to premature failure of various machine components.

In contrast, the preload assembly 116 of the tillage implement 100 compresses and thus preloads the compression springs 136 near or at an operating force before the rotary disc 102 or other soil-working tool comes into contact with the soil. The shank 104 of the tillage implement 100 is thus stiffer as compared to known rubber shank assemblies and more predictable when it contacts the soil, all while utilizing compression springs 136 with sufficiently low stiffness to enable ease of assembly, which are sufficiently pliable in the field to overcome obstacles, and which are not prone to premature failure. Unlike known rubber shank assemblies, the shank 104 does not oscillate between low load and high load conditions (and positions) when contacting the soil, providing a more uniform depth and quality of operation versus a rubber spring shank with no preload.

The preload assembly 116 generally includes a bolt 138, a bushing 140, a tube 142, and a nut 144 that collectively extend between a shank plate 146 that is fixedly coupled (e.g., welded) to the shank 104 and a bracket plate 128 that is fixedly coupled (e.g., welded) to the mounting bracket 106 or part of a frame of a tilling machine. The bushing 140 abuts the head of the bolt 138 and can include an elastomeric, annular component that surrounds the bolt 138 and that acts as a shock absorber, which will be discussed more fully below in connection with FIG. 10. The bushing 140 may include other components such as one or more washers or similar. For example, in some embodiments the bushing 140 may include two washers that sandwich the elastomeric component with one washer abutting the head of the bolt 138 and the other abutting the shank plate 146 when the tillage implement 100 is in the preloaded state (FIG. 9).

The tube 142 of the preload assembly 116 acts a spacer and as a stop when tightening the nut 144 on the bolt 142, resulting in a predetermined load being exerted on the compression springs 136, as will become more apparent below. The tube 142 is generally cylindrical and hollow and surrounds a portion of the shaft of the bolt 138. To assemble the preload assembly 116, the bolt 138 is inserted through a central opening of the bushing 140, inserted through an elongated opening 148 in the shank plate 146 (FIGS. 1 and 7), inserted through the tube 142, and inserted through a through hole in bracket plate 128. The nut 144 is then threaded onto the threaded distal end of the bolt 138.

Figure 1:
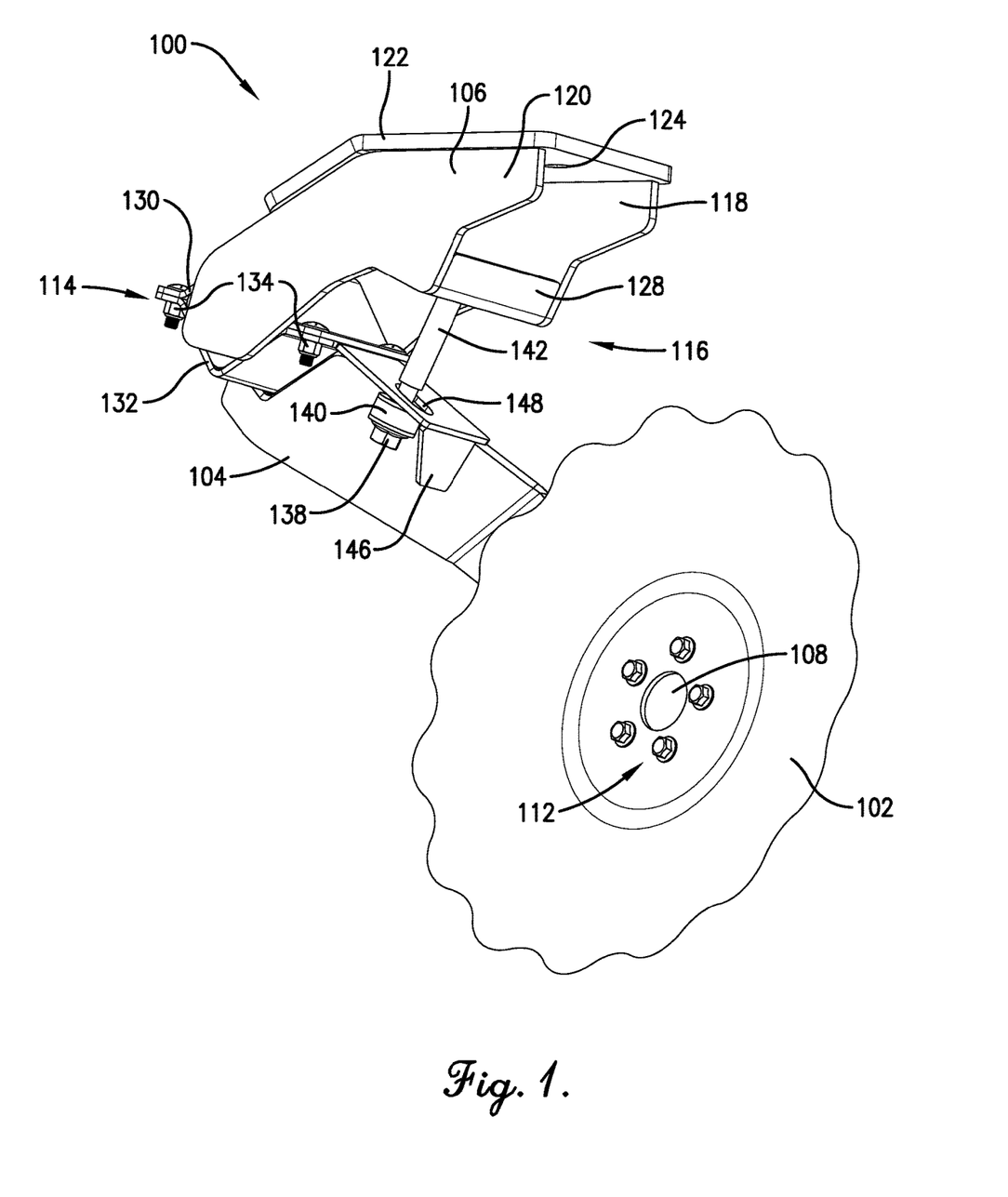
FIG. 1 is a perspective view of a tillage implement in an unloaded, or equilibrium, state according to one embodiment of the invention.
Figure 2:
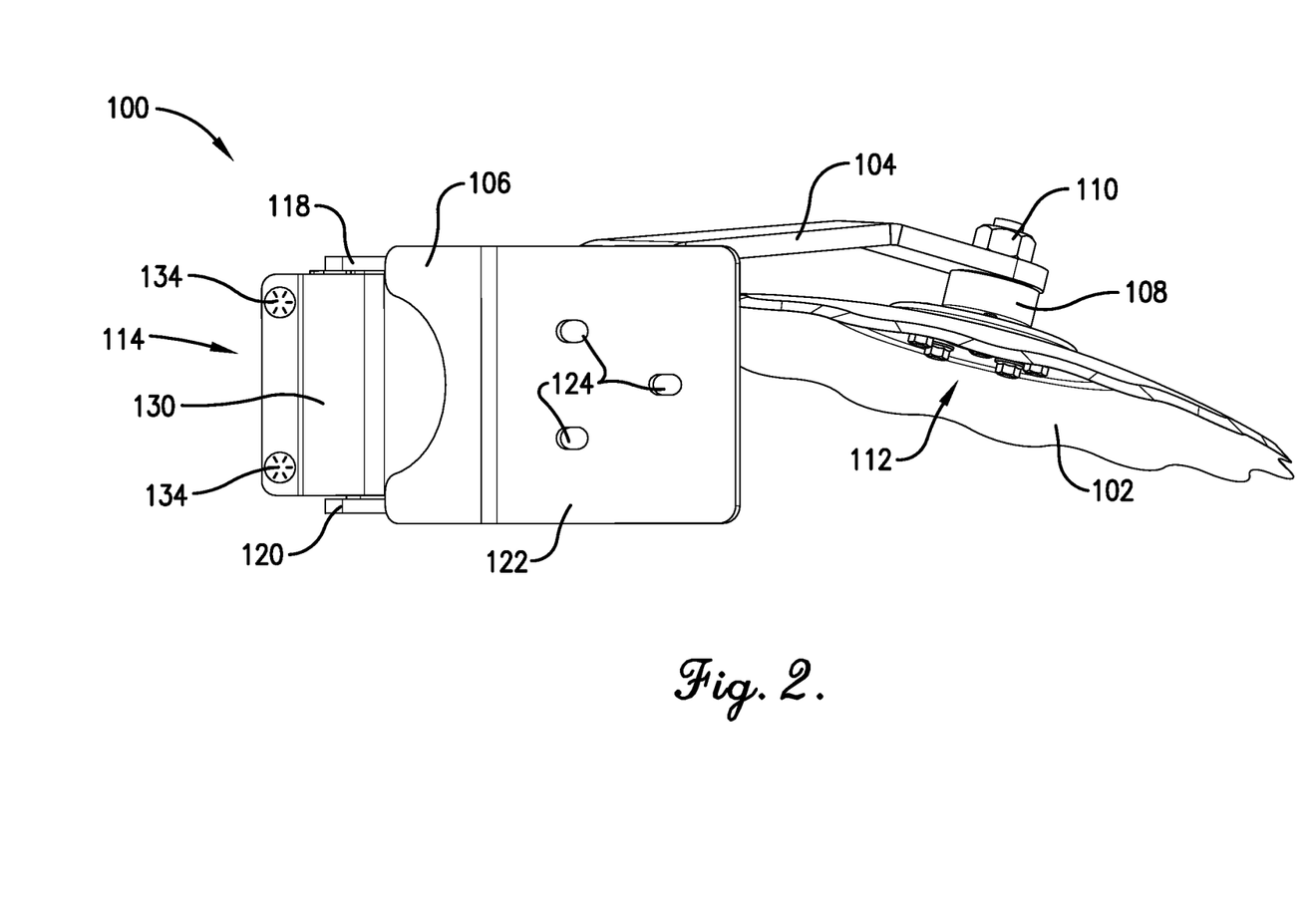
FIG. 2 is a top view of the tillage implement shown in FIG. 1.
Figure 3:
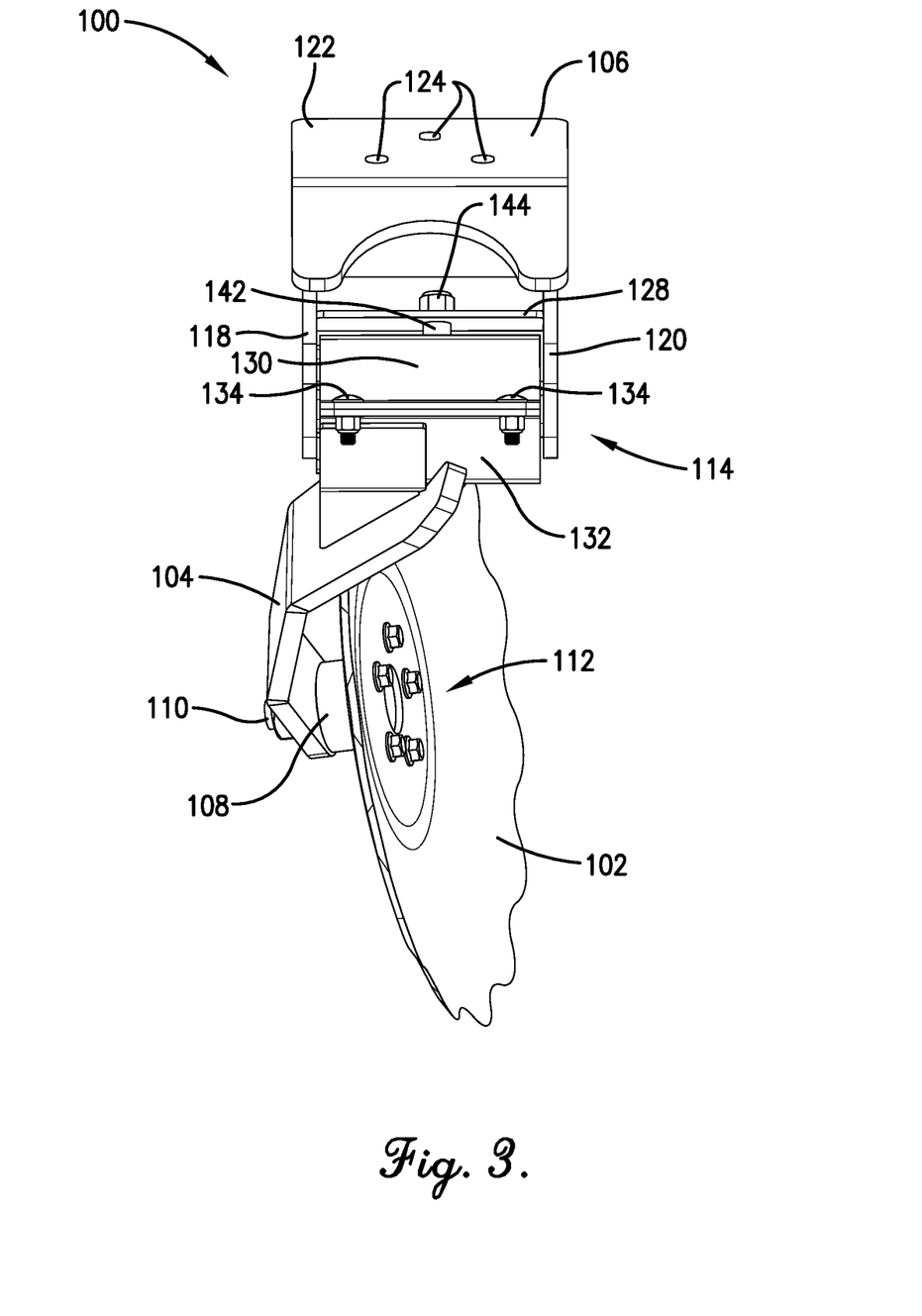
FIG. 3 is a front view of the tillage implement shown in FIGS. 1-2.
Figure 4:
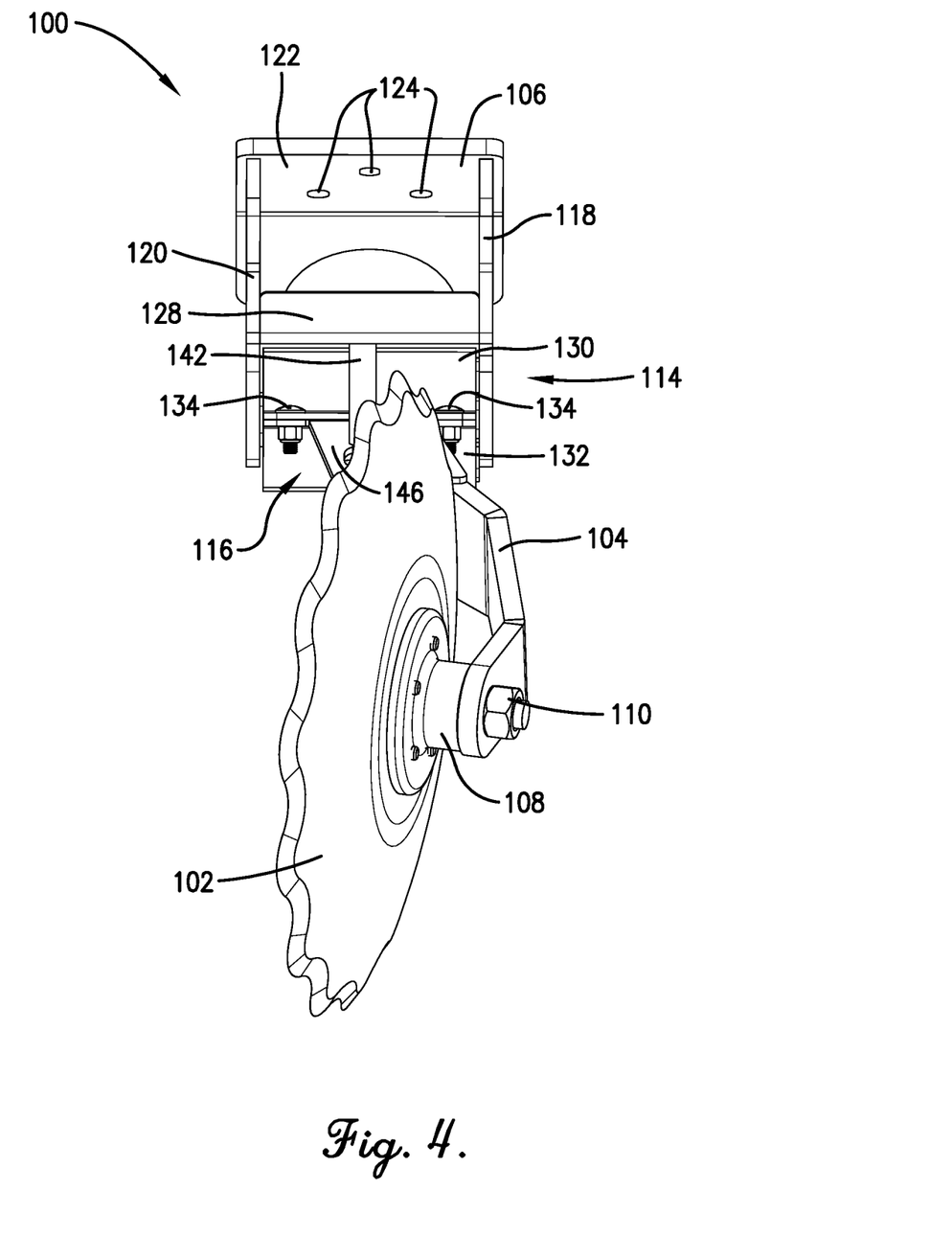
FIG. 4 is a back view of the tillage implement shown in FIGS. 1-3.
Figure 5:
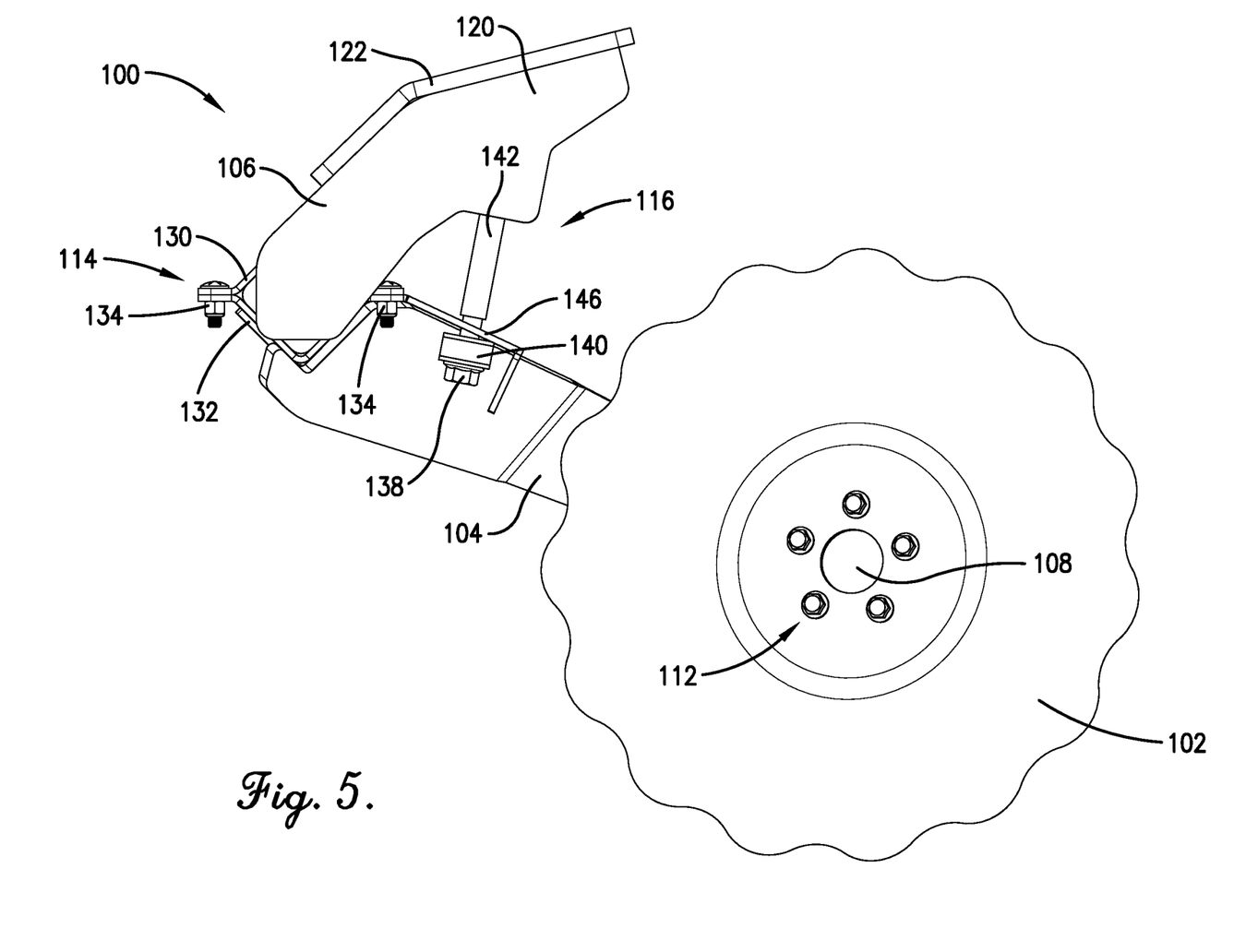
FIG. 5 is a right-side view of the tillage implement shown in FIGS. 1-4.
Figure 6:
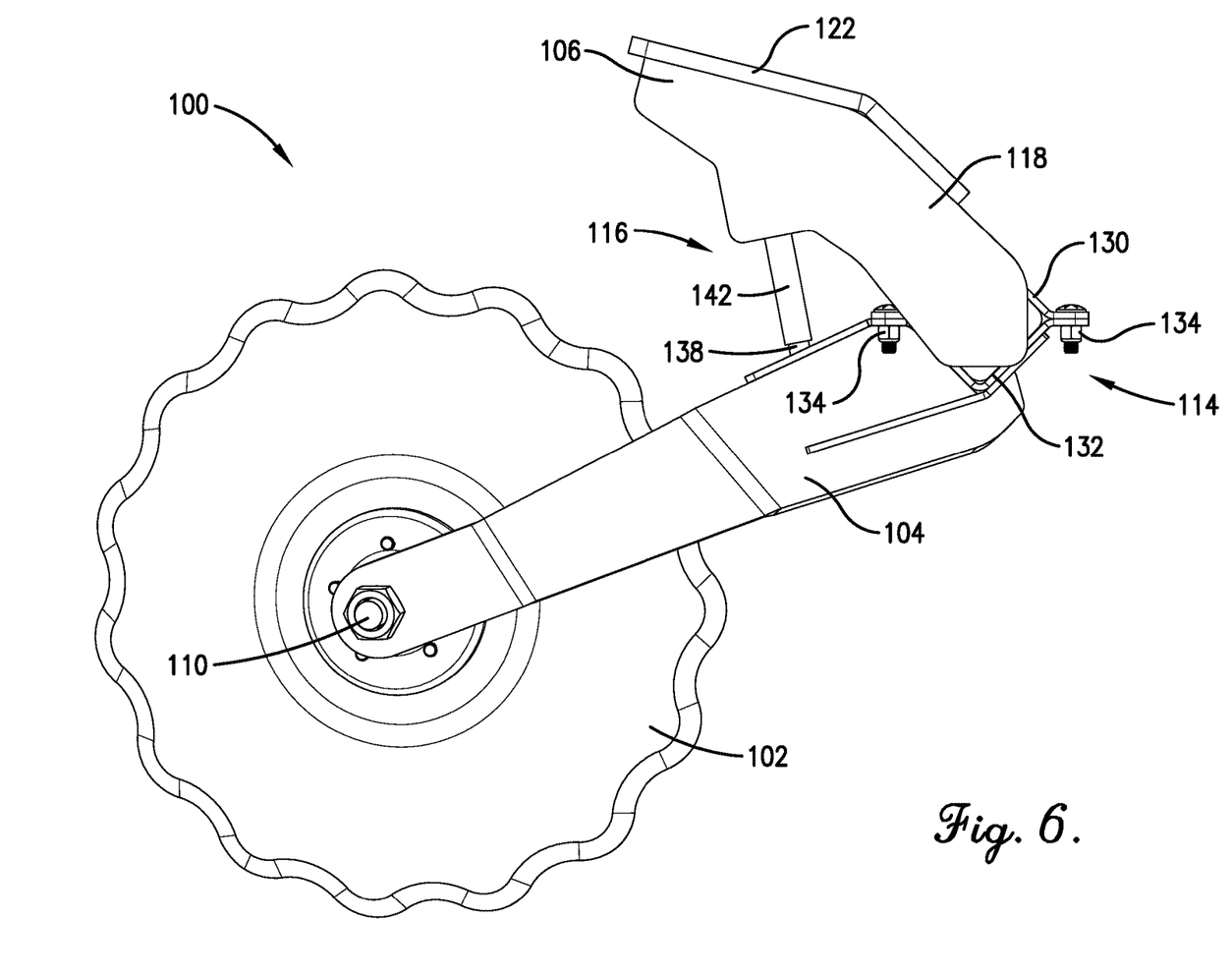
FIG. 6 is a left-side view of the tillage implement shown in FIGS. 1-5.
Figure 7:
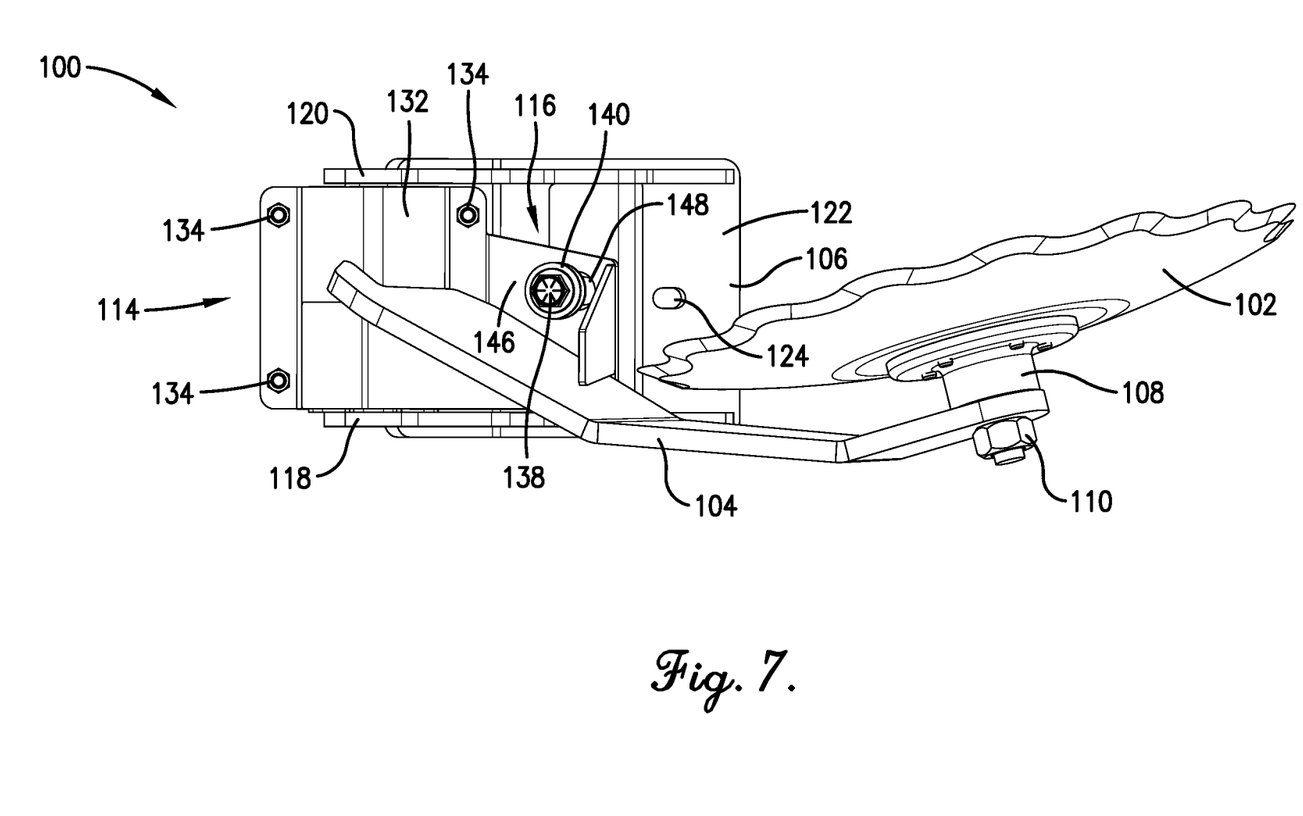
FIG. 7 is a bottom view of the tillage implement shown in FIGS. 1-6.
Figure 8:
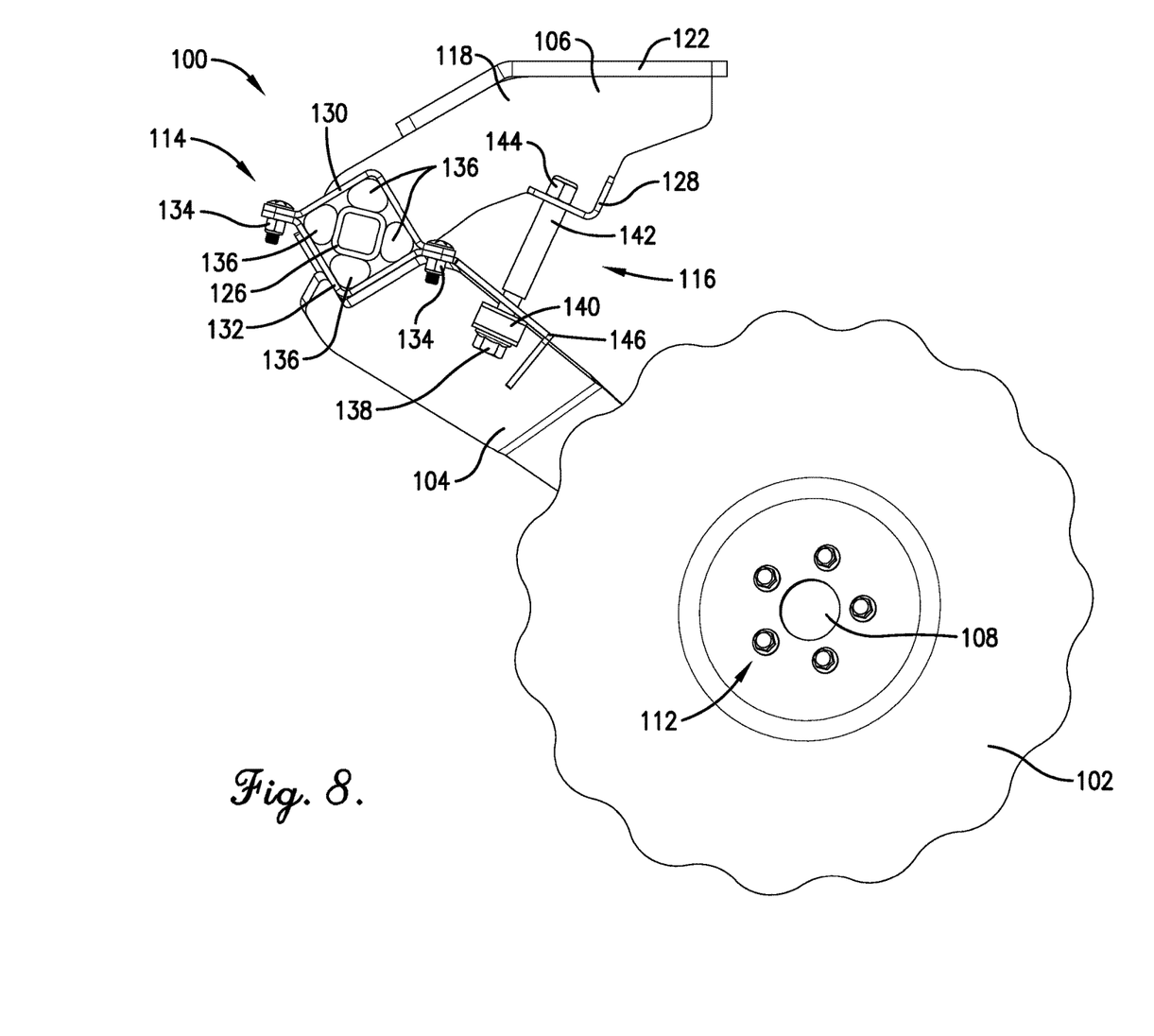
FIG. 8 is a right-side view of the tillage implement shown in FIGS. 1-7 and including a portion of the mounting bracket removed to show internal components of the tillage implement.

Prior to tightening the bolt 138 and nut 144 against the tube 142, the tillage implement 100 will be in an unloaded position, as shown in FIGS. 1-8. In this state, the tillage implement 100 behaves like known spring shank assemblies, in that if the implement 100 were to contact the soil, the shank 104 would initially deflect until the compression springs 136 compressed to a point in which they reached their operating load. This may be best understood with reference to FIG. 8, which shows the tillage implement 100 with side wall 120 removed in order to illustrate the internal components of the hinge assembly 114, and which shows the preload assembly 116 in an unloaded state—that is, in a state in which the bolt 138 has not been tightened against the tube 142. As seen in FIG. 8, the tubular member 126 has a substantially square cross-section. Similarly, the hinge housing 130, 132 similarly has a substantially square cross-section (ignoring the flanges thereof) and is oriented such that it is rotated approximately forty-five degrees with respect to the tubular member 126. Each of the four compression springs 136 is sandwiched between a corresponding face of the tubular member 126 and an internal corner of the hinge housing 130, 132.

In this regard, the compression springs 136 become somewhat compressed as the hinge housing 130, 132 is assembled. That is, each of the elastomeric compression springs 136 is generally cylindrical and thus has a circular cross-section when in an uncompressed state. As the hinge assembly is assembled—that is, as the hinge housings 130, 132 are removably coupled to one another via fasteners 134—each one of the compression springs 136 becomes sandwiched between a respective face of the tubular member 126 and an internal corner of the housing 130, 132—and becomes compressed and thus slightly distorted as the fasteners 134 are tightened, as illustrated by the irregular cross-section of the springs 136 shown in FIG. 8. Nonetheless, the compression springs 136 are configured to become even further distorted as the tillage implement 100 interacts with the soil, causing the biasing force of each to increase, thus biasing the shank 104 and disc 102 to an operating position after the shank 104 and disc 102 pivots up encounters a rock or the like, which will be discussed more fully below.

If no preload assembly 116 was included on the tillage implement 100, or if else the preload assembly 116 was not tightened to a preload state as is the case shown in FIG. 8, then when the tillage implement 100 was lowered to interact with the soil the very interaction of the disc 102 with the soil would cause the shank 104 to pivot upwards, compressing each of the springs 136 further. In practice, this initial loading of the compression springs 136 has proven to be problematic because the depth and/or location of cut varies, providing inconsistent results.

Thus, aspects of the invention include tightening the bolt 138 against the tube 142, which in turn preloads the compression springs 136 near or at an operating load, such that when the tillage implement 100 contacts the soil, the shank 104 pivots upward minimally or even not at all. This preloaded state is illustrated in FIG. 9, which again shows the tillage implement without side wall 120 in order to show the internal compression springs 136 and other features. In this figure, the nut 144 and bolt 138 have been tightened, forcing the shank 104 to pivot upwards. More particularly, as the bolt 138 is tightened down against the tube 142, the bushing 140 contacts the shank plate 146 and causes the shank plate 146 to move (via the shank pivoting about the tubular member 126 and further compressing the compression springs 136) towards the bracket plate 128. The shank 104 continues to pivot until the bolt 138 is tightened against the tube 142 and more particularly until the bushing 140 is firmly seated against a lower end of the tube 142 and the opposite, upper end of the tube 142 is firmly seated against the bracket plate 128. In this state, the compression springs 136 are preloaded to at or near an operating load. In some embodiments, the compression springs 136 are preloaded to a load of at least 100 pounds, and more particularly a load between 100 and 400 pounds. In some embodiments, the compression springs 136 are preloaded to a load of between 200 and 300 pounds, and more particularly approximately 250 pounds.

Because in this state the compression springs 136 are preloaded to at or near an operating load, the shank 104 will not pivot or else will only minimally pivot when the tillage implement 100 is lowered and the disc 102 contacts the soil. Put another way, there will be no deflection (or else very little deflection for excessively dry soil) of the shank 104 because the compression springs 136 are preloaded to at or near the operating load via the preload assembly 116. This beneficially provides a more uniform depth and location of cut, among other benefits.

For example, the resistance of the soil to the disc 102 may vary from nearly zero up to 400 pounds or even more depending on soil conditions, type and location of field, among other variables. That is, when a field is very wet, the resistance of the soil is negligible and thus may exert a near zero resistance on the disc 102. But when the field is extremely dry, the soil may exert 400 pounds of resistance or even more on the disc 102 as it is lowered into the field. Under typical or normal operating conditions, the resistance exerted on the disc 102 by the soil may be somewhere in between, such as at least 100 pounds and, more particularly, approximately 250 pounds. For known spring shank assemblies, the initial deflection of the shank will vary widely when used in these varying conditions, leading to inconsistent cutting depths and tilling performance. However, when the compression springs 136 are preloaded to at or near the operating load via the preload assembly 116—that is, when the compression springs 136 are preloaded to at least 100 pounds and, more particularly, approximately 250 pounds, as one non-limiting example, by the preload assembly 116—the disc 102 will not deflect or else only minimally deflect when lowered into most soil conditions, thus providing a more uniform depth and location of cut, providing the a user the ability to till to a uniform depth while crossing varied field conditions unlike known spring shank assemblies.

The preload assembly 116 is configured to permit further deflection of the shank 104 from the preloaded or operating position (FIG. 9) in response to, for example, the disc 102 encountering a rock or other obstacle in a field. This will be more readily understood with reference to FIG. 10, which like FIGS. 8 and 9 shows the tillage implement 100 with the side wall 120 removed to show the internal components thereof. Again, the shank plate 146 includes an elongated opening 148 that is wider than the outer diameter of the tube 142, but which is narrower than the diameter of the bushing 140. In that regard, the shank plate 146 (and thus the shank 104 fixedly coupled thereto) cannot pivot downwards of the preloaded position shown in FIG. 9, because the opening 148 cannot pass over the bushing 140.

Figure 9:
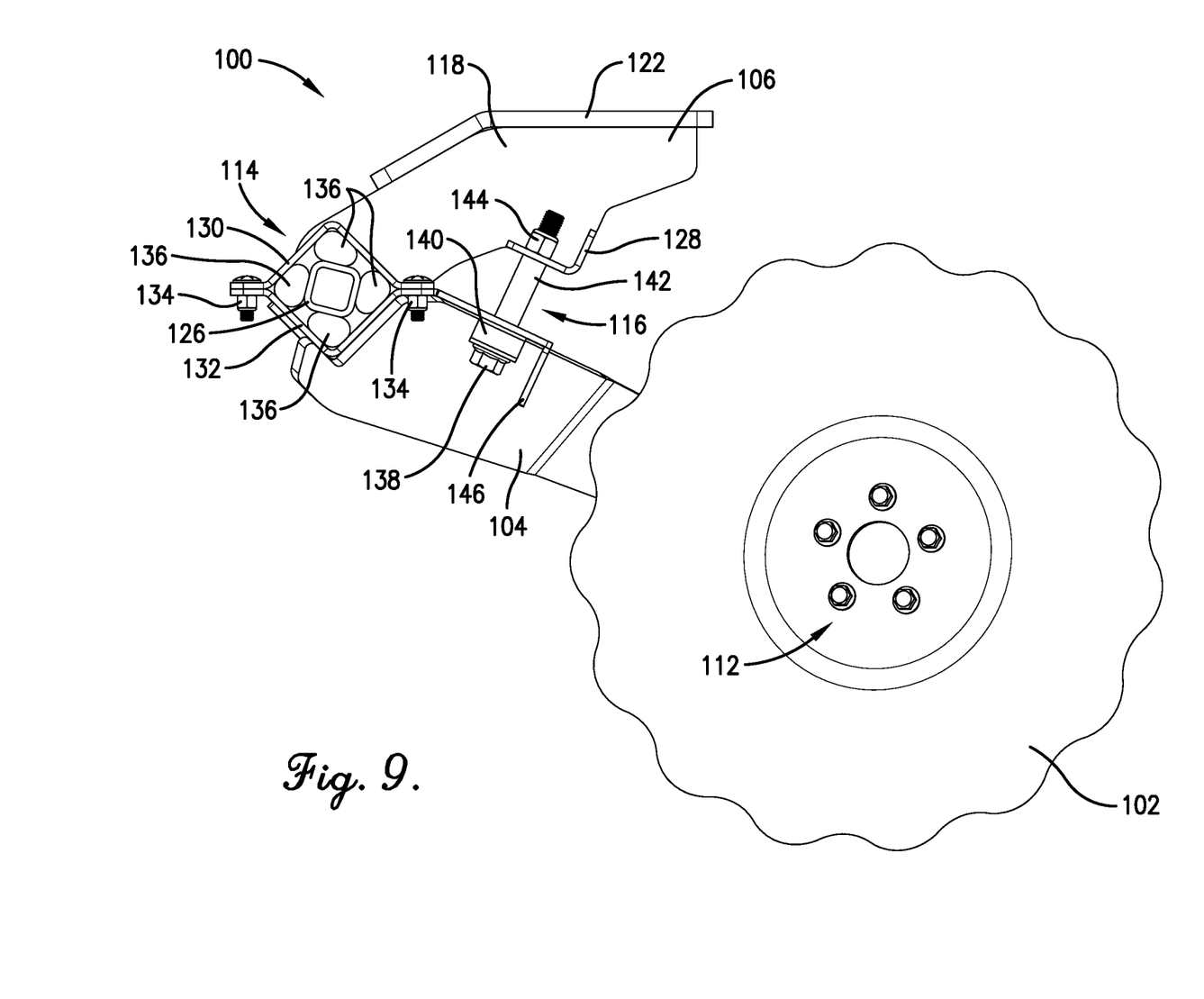
FIG. 9 is a right-side view of the tillage implement shown in FIG. 8 but in a preloaded state according to one embodiment of the invention.
Figure 10:
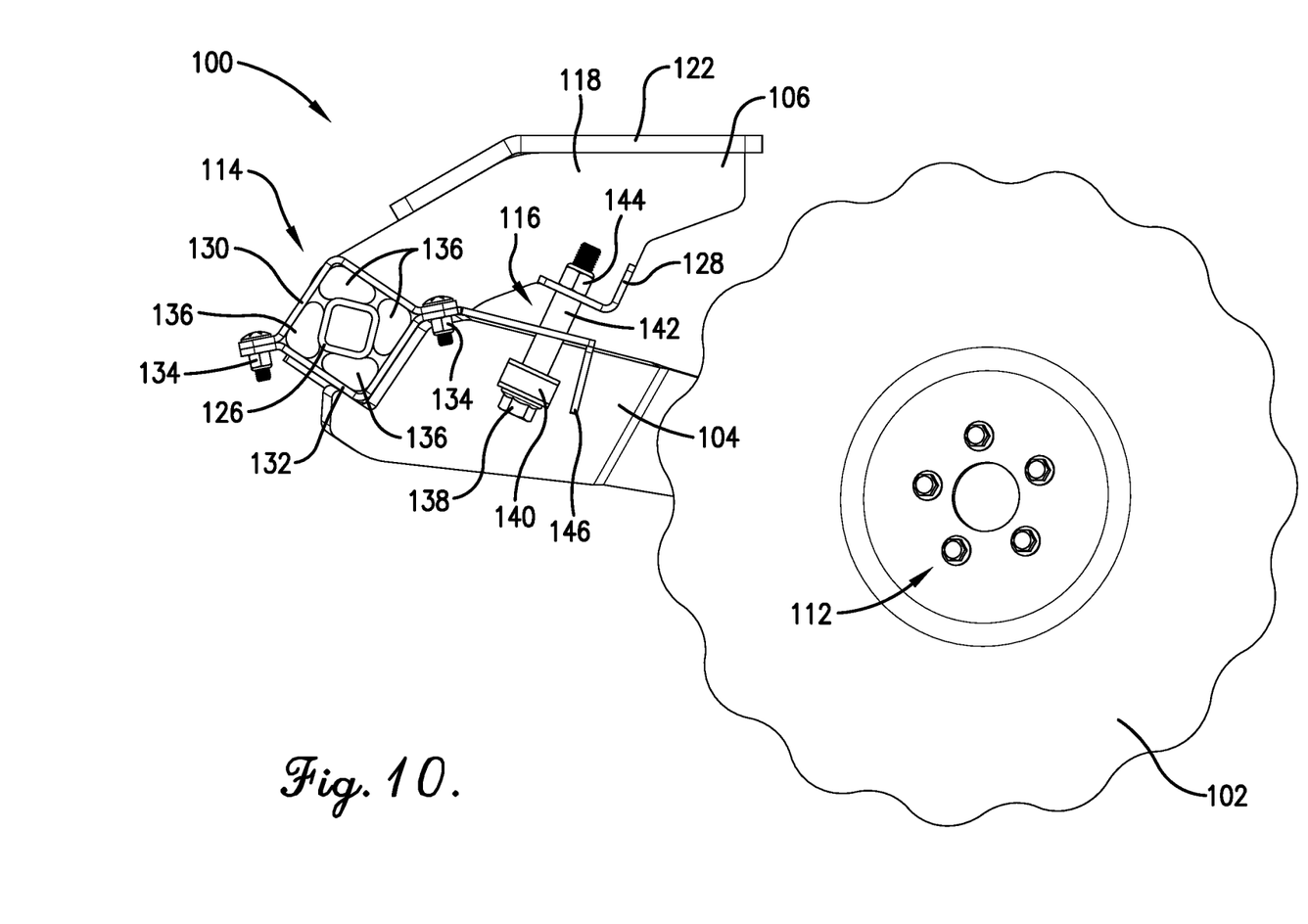
FIG. 10 is a right-side view of the tillage implement shown in FIGS. 8-9 but in a deflected state according to aspects of the invention.

However, the shank plate 146 (and thus the shank 104 fixedly coupled thereto) is permitted to further deflect and pivot upwards from the preloaded position shown in FIG. 9, because the opening 148 can pass over the tube 142. Thus, when the disc 102 encounters an obstacle, it deflects upwards to a position such as that shown in FIG. 10, further loading the compression springs 136 as depicted by the distorted cross-section thereof. This increases the biasing force on the shank 104 via the compression springs 136, such that after passing over the obstacle the shank 104 is biased downward until the disc 102 encounters the soil and the shank plate 146 encounters the bushing 140. In embodiments in which the bushing includes an elastomeric absorber or similar, the bushing 140 absorbs the impact from the shank plate 146, thus reducing risk of failure of the components of the preload assembly 116 as the tillage implement bounces back to the preloaded position (FIG. 9).

Figure 11:
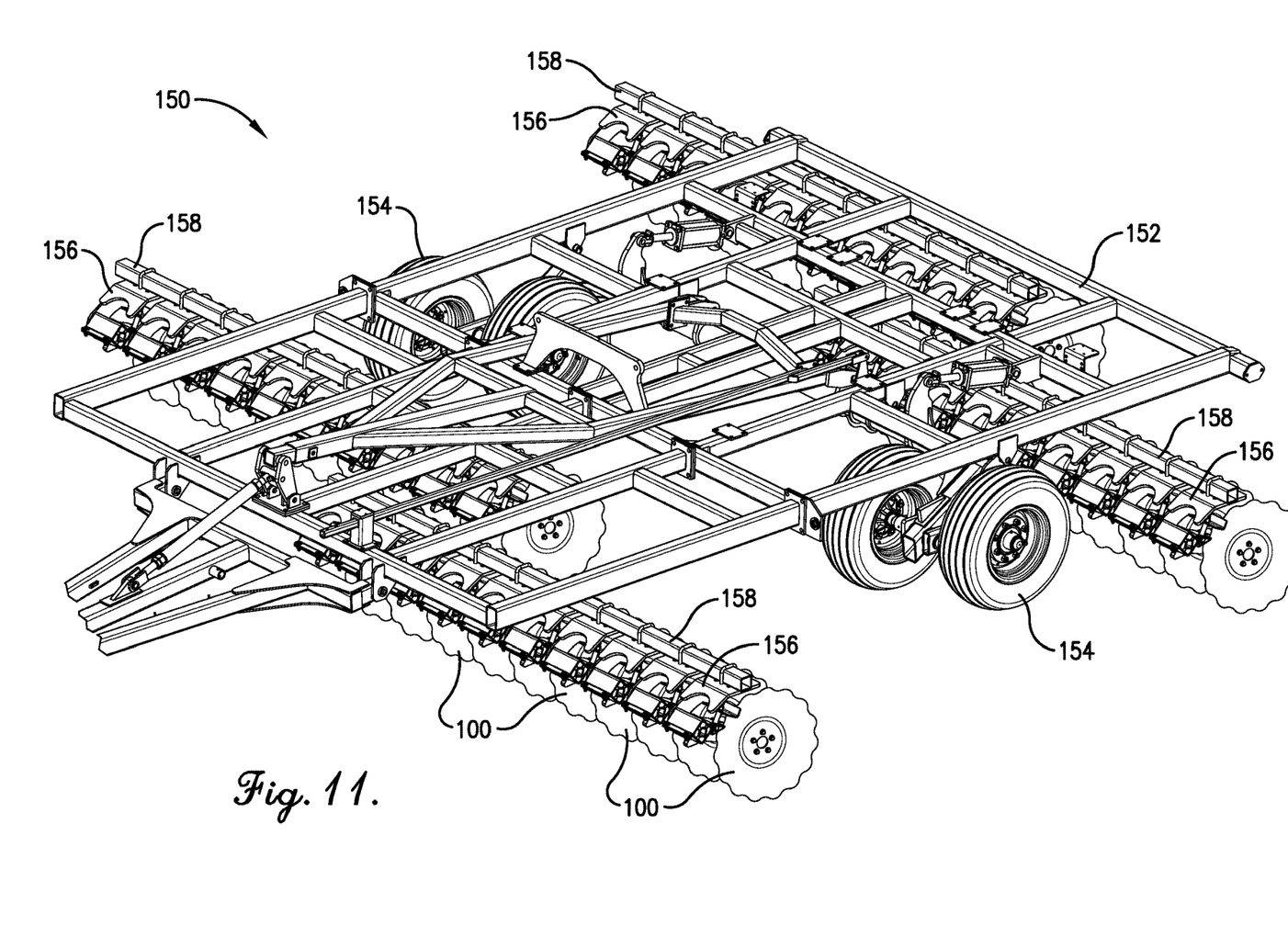
FIG. 11 is a perspective view of a tilling machine including a plurality of the tillage implements shown in FIGS. 1-10 mounted to a rolling frame.

In some embodiments, one or more of the tillage implements 100 may be mounted to a rolling frame 152 of a tillage machine 150, as shown in FIG. 11. In this embodiment, the mounting bracket 106 of each tillage implement 100 is mounted to a bar 158 together with other tillage implements 100 to form a row 156 of tillage implements 100. The bar 158 of each row 156, in turn, is mounted to a rolling frame 152 of the tillage machine 150, which is configured to roll along a field via wheels 154 rotatably coupled thereto. In other embodiments, one or more tillage implements 100 may be directly mounted directly to the rolling frame 152 without departing from the scope of the invention. Moreover, in some embodiments, multiple rows 156 can be mounted to the rolling frame 152, optionally in a staggered fashion, as shown. In such embodiments, each of the tillage implements 100 includes a respective preload mechanism 116 in order to provide predictable movement of the discs 102 (or more appropriately, lack thereof) when the rows 156 come into contact with the soil.

Still more, in some embodiments multiple ones of the tillage implements 100 may be optionally gang mounted to a common frame member. For example, as discussed, in some embodiments the tubular member 126 may be an elongated tubular member that spans horizontally across more than one of the tillage implements 100 with the hinge assembly 114 of each tillage implement coupled thereto. In such embodiments, a single bracket plate 128 may optionally span horizontally across more than one of the tillage implements 100 as well. For example, an integral bracket plate 128 may include multiple through holes, each corresponding to one of the multiple tillage implements 100. When the tillage implements are gang mounted to an elongated tubular member or other frame member, the preload assembly 116 of each tillage implement, and more particularly the bolt 138 thereof, are inserted through the corresponding through hole of the common, elongated bracket plate 128 and then tightened to the preloaded state, as discussed.

What is claimed is:

1. A tillage implement comprising:
   a mounting bracket configured to be removably coupled to a rolling frame;
   a shank pivotably coupled to the mounting bracket via a hinge assembly, the hinge assembly including a rotation inhibiting assembly biasing the shank toward an unloaded position relative to the mounting bracket;
   a soil working tool operatively coupled to a distal end of the shank; and
   a preload assembly for moving the shank to a loaded position that is rotationally offset from the unloaded position,
   wherein the preload assembly comprises (i) a fastener that extends between the shank and the mounting bracket, and (ii) a hollow tube that surrounds a portion of the fastener,
   wherein the fastener is configured to be actuated to move the shank with respect to the mounting bracket and to impart a load on the rotation inhibiting assembly, wherein the tube is configured to act as a stop when actuating the fastener such that when a lower end of the tube is firmly seated against a bushing proximate a head of the fastener and an upper end of the tube is firmly seated against the mounting bracket, the rotation inhibiting assembly is loaded to an operating load,
   wherein when the rotation inhibiting assembly is loaded to the operating load, the shank is positioned in the loaded position.

2. The tillage implement of claim 1, wherein the rotation inhibiting assembly includes a plurality of compression or torsion springs, and wherein the preload assembly compresses and thus preloads the plurality of compression or torsion springs.

3. The tillage implement of claim 2, wherein the preload assembly moves the shank to a first position relative to the mounting bracket, wherein the shank is configured to pivot from the first position to a second position during use of the tillage implement, and wherein pivoting from the first position to the second position further compresses the plurality of compression or torsion springs.

4. The tillage implement of claim 2, wherein the preload assembly preloads the plurality of compression or torsion springs to a load of at least 100 pounds.

5. The tillage implement of claim 1, wherein the fastener comprises a bolt, wherein the preload assembly further includes a nut, wherein the shank includes a shank plate with an elongated opening for receiving the bolt, wherein the mounting bracket includes a bracket plate including a through hole for receiving the bolt, and wherein the bolt extends from the shank plate to the bracket plate.

6. The tillage implement of claim 5, wherein the tube is disposed between the shank plate and the bracket plate.

7. The tillage implement of claim 5, wherein the bushing proximate the head of the fastener is in contact with the shank plate.

8. A tillage machine comprising:
   a rolling frame configured to be pulled by a tow vehicle when tilling a field; and
   a plurality of tillage implements operatively coupled to the rolling frame and configured to contact and till the field as the rolling frame is being pulled by the tow vehicle, wherein each of the plurality of tillage implements includes:
      a mounting bracket configured to be removably coupled to the rolling frame,
      a shank pivotably mounted with respect to the rolling frame via a hinge assembly, the hinge assembly including a rotation inhibiting assembly biasing the shank toward an unloaded position relative to the mounting bracket;
      a soil working tool operatively coupled to a distal end of the shank; and
      a preload assembly for moving the shank to a loaded position that is rotationally offset from the unloaded position,
      wherein the preload assembly comprises (i) a fastener that extends between the shank and the mounting bracket, and (ii) a hollow tube that surrounds a portion of the fastener,
      wherein the fastener is configured to be actuated to move the shank with respect to the mounting bracket and to impart a load on the rotation inhibiting assembly, wherein the tube is configured to act as a stop when actuating the fastener such that when a lower end of the tube is firmly seated against a bushing proximate a head of the fastener and an upper end of the tube is firmly seated against the mounting bracket, the rotation inhibiting assembly is loaded to an operating load,
      wherein when the rotation inhibiting assembly is loaded to the operating load, the shank is positioned in the loaded position.

9. The tillage machine of claim 8, wherein, for each of the tillage implements, the rotation inhibiting assembly includes a plurality of compression or torsion springs, and wherein the preload assembly compresses and thus preloads the plurality of compression or torsion springs.

10. The tillage machine of claim 9, wherein, for each of the tillage implements, the preload assembly moves the shank to a first position relative to the rolling frame, wherein the shank is configured to pivot from the first position to a second position as the tillage machine tills the field, and wherein pivoting from the first position to the second position further compresses the plurality of compression or torsion springs.

11. The tillage machine of claim 9, wherein, for each of the tillage implements, the preload assembly preloads the plurality of compression or torsion springs to a load of at least 100 pounds.

12. The tillage machine of claim 8,
wherein, for each of the tillage implements:
  wherein the fastener comprises a bolt, and wherein the preload assembly further includes a nut, and
  the shank includes a shank plate with an elongated opening for receiving the bolt, and
  wherein the mounting bracket includes a bracket plate including a corresponding through hole for receiving each bolt, and
  wherein each bolt extends from a corresponding shank plate to the bracket plate.

13. The tillage machine of claim 12, wherein the rolling frame includes an elongated frame member, and wherein the hinge assembly of each of the plurality of tillage implements is operably coupled to the elongated frame member.

14. The tillage machine of claim 12, wherein, for each of the tillage implements, the bushing proximate the head of the fastener is in contact with the shank plate.

15. A method comprising:
  (a) attaching a tillage implement to a rolling frame, the tillage implement comprising:
  a mounting bracket configured to removably couple to the rolling frame,
  a shank pivotably coupled to the mounting bracket via a hinge assembly, the hinge assembly including a rotation inhibiting assembly biasing the shank toward an unloaded position relative to the mounting bracket,
  a soil working tool coupled to a distal end of the shank, and
  a preload assembly extending from the shank to the mounting bracket,
  wherein the preload assembly comprises (i) a fastener that extends from the shank to the mounting bracket, and (ii) a hollow tube that surrounds a portion of the fastener,
  wherein the fastener is configured to be actuated to move the shank with respect to the mounting bracket and to impart a load on the rotation inhibiting assembly, wherein the tube is configured to act as a stop when actuating the fastener such that when a lower end of the tube is firmly seated against a bushing proximate a head of the fastener and an upper end of the tube is firmly seated against the mounting bracket, the rotation inhibiting assembly is loaded to an operating load,
  wherein when the rotation inhibiting assembly is loaded to the operating load, the shank is positioned in a loaded position;
  (b) preloading the hinge assembly by actuating the fastener to move the shank to the loaded position that is rotationally offset from the unloaded position; and
  (c) contacting the soil with the soil working tool.

16. The method of claim 15, wherein the rotation inhibiting assembly includes a plurality of compression or torsion springs, and wherein preloading the hinge assembly includes compressing and thus preloading the plurality of compression or torsion springs.

17. The method of claim 16, wherein preloading the plurality of compression or torsion springs includes moving the shank to a first position relative to the mounting bracket, the method further comprising pulling the soil working tool along a surface and causing the shank to pivot from the first position to a second position thereby further compressing the plurality compression or torsion springs.

18. The method of claim 17 further comprising causing the shank to pivot from the second position back to the first position via a biasing force provided by the plurality of compression or torsion springs.

19. The method of claim 16 further comprising preloading the plurality of compression or torsion springs to a load of at least 100 pounds.

20. The method of claim 16, wherein each of the plurality compression or torsion springs is an elastomeric compression or torsion spring, and wherein preloading the plurality of compression or torsion springs comprises deforming the compression or torsion springs to thereby increase a biasing force exerted by the plurality of compression or torsion springs on the shank.

* * * * *